US006377669B1

(12) United States Patent
Walker et al.

(10) Patent No.: US 6,377,669 B1
(45) Date of Patent: Apr. 23, 2002

(54) METHOD AND APPARATUS FOR AWARDING AND REDEEMING PREPAID TELEPHONE TIME

(75) Inventors: Jay S. Walker, Ridgefield; James A. Jorasch, Stamford, both of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/044,881

(22) Filed: Mar. 20, 1998

Related U.S. Application Data

(62) Division of application No. 08/820,500, filed on Mar. 19, 1997.

(51) Int. Cl.[7] ...................... H04M 15/00; H04M 17/00; H04M 11/00; A63F 9/22

(52) U.S. Cl. .............................. 379/144.05; 379/93.13; 379/112.01; 379/114.01; 379/144.06; 463/20; 463/21

(58) Field of Search ................................ 379/112, 114, 379/144, 93.13; 463/16, 21, 25, 27, 29–30, 1, 11–13, 20, 36, 40–42; 705/10, 15, 26

(56) References Cited

U.S. PATENT DOCUMENTS

| | | | | |
|---|---|---|---|---|
| 4,706,275 A | | 11/1987 | Kamil | 379/144 |
| 5,038,022 A | | 8/1991 | Lucero | 235/380 |
| 5,129,652 A | | 7/1992 | Wilkinson | 273/139 |
| 5,179,517 A | | 1/1993 | Sarbin et al. | 364/410 |
| 5,332,076 A | | 7/1994 | Ziegert | 194/217 |
| 5,359,642 A | | 10/1994 | Castro | 379/121 |
| 5,429,361 A | | 7/1995 | Raven et al. | 273/138 A |
| 5,469,497 A | | 11/1995 | Pierce et al. | 379/115 |
| 5,488,411 A | | 1/1996 | Lewis | 348/8 |
| 5,504,808 A | * | 4/1996 | Hamrick, Jr. | 379/114 |
| 5,559,312 A | | 9/1996 | Lucero | 235/380 |
| 5,608,785 A | * | 3/1997 | Kasday | 379/93.13 |
| 5,639,088 A | * | 6/1997 | Schneider et al. | 463/25 |
| 5,719,926 A | * | 2/1998 | Hill | 379/144 |
| 5,983,196 A | * | 11/1999 | Wendkos | 705/14 |
| 6,007,426 A | * | 12/1999 | Kelly et al. | 463/16 |
| 6,009,412 A | * | 12/1999 | Storey | 705/14 |
| 6,139,431 A | * | 10/2000 | Walker et al. | 463/20 |

OTHER PUBLICATIONS

"Welcome to the TLC Players Club," advertisement, Jan. 14, 1997 "DCI Telecommunications (DCIT) Electronic Bulletin Board," Businesswire, Inc., Feb. 16, 1995.

Gaming Machines Rush The Limits of Legality, Austin–American Statesman, Aug. 2, 1996.

* cited by examiner

*Primary Examiner*—Binh Tieu
(74) *Attorney, Agent, or Firm*—Steven M. Santisi

(57) ABSTRACT

A slot card issued by a slot club, or a membership card in another incentive award program, that is also capable of being used as phone calling card is provided. Free calling time is credited to the member's card account in response to the playing of the slot machine or utilizing the respective service. After incentive points are awarded, the member may use the membership card as a prepaid phone calling card, whereby the member's account is debited for the cost of the call.

1 Claim, 6 Drawing Sheets

MEMBER DATABASE 200

| MEMBER ID NUMBER | BIOGRAPHICAL INFORMATION | HISTORICAL USAGE INFORMATION | CURRENT ACCOUNT BALANCE |
|---|---|---|---|
| | | | |
| | | | |
| | | | |

FIG. 2

CALLS RECORD DATABASE 300

| CALL ID NUMBER | DATE OF CALL | TIME OF CALL | CALLED NUMBER | CALL DURATION | CARRIER'S MEMBER ID NUMBER |
|---|---|---|---|---|---|
| | | | | | |
| | | | | | |
| | | | | | |

FIG. 3

METHOD AND APPARATUS FOR AWARDING AND REDEEMING PREPAID TELEPHONE TIME

This application is a division under 37 C.F.R. §1.53(b) of application Ser. No. 08/820,500 filed Mar. 19, 1997.

BACKGROUND OF THE INVENTION

The present invention relates generally to a system for awarding prizes to members of an incentive program, such as a casino slot club, and more particularly, to a system for utilizing the membership card for such an incentive program as a prepaid phone calling card to award and redeem points to a member in the form of prepaid time for a telecommunications service.

Slot machines, such as video poker, reel machines, video keno or video blackjack devices (hereinafter, collectively referred to as "slot machines"), are an important source of income for the gaming industry. Despite the fact that the odds generally favor the casino, players still play slot machines in large numbers, in hopes of hitting a large jackpot, as well as for their entertainment value.

Each slot machine is designed to ensure that, on average, the casino retains a predetermined percentage of the total amount gambled (the house advantage or "vigorish") In fact, slot machines generally have a higher house advantage than the table games of blackjack, poker or craps. Thus, the more these slot machines are played, the greater the revenue to the casino.

Accordingly, casinos constantly search for marketing strategies and programs to appeal to players and to distinguish their slot machines from competitors in the industry. For example, as an added incentive to play their slot machines, many casinos offer "slot club" programs to reward slot machine players. Each player in a slot club is generally issued a player tracking card encoded with the players' tracking identifier. The casino awards "player reward points" for the player as he plays slot machines in that casino. The "player reward points" can generally be redeemed for merchandise or services at the casino hotel.

In many cases, however, the incentive provided by conventional slot club programs may not be sufficient to attract new players or to retain existing casino players at slot machines. With conventional slot club programs, for example, the player reward points must typically be exchanged for merchandise and services at the casino hotel. Thus, once the player has left the casino, the player has limited options for redeeming the points in a convenient manner.

In addition, although it would be desirable for casinos to give a small, immediate and affordable reward to a player for his continued play, conventional slot machines can only pay out an integral numbers of coins. Thus, a small reward of a fractional amount of less than one coin is impractical with conventional systems. If a casino could cost-effectively provide an award to players every time the player pulls the handle, the slot machine may be advantageously promoted as providing a "win for every spin."

It is well known for vendors to sell prepaid calling cards for telephone calls at a fixed or standard rate. Such prepaid calling cards may allow, for example, the caller to call anywhere in the United States at any time of the day for a rate of 16 cents per minute, with a correspondingly higher rate charged for international calls. In addition, "rechargeable" prepaid calling cards are known which may be recharged by purchasing additional time, generally in blocks of minutes. Since the prepaid calling card is merely a pointer to an account maintained by the vendor, the card itself is not necessarily required to make a telephone call. There are no known prepaid calling cards, however, which allow minutes to be accumulated as an incentive award for the use of a particular service.

One casino slot card club offers a separate "giveaway" prepaid calling card, having a predefined value, as an incentive to join the club. However, this additional card simply acts as a standard prepaid calling card, and does not function as a slot card. Once the prepaid calling time is used up, the prepaid calling card cannot be refreshed by slot usage. Moreover, none of the known slot cards permit the accumulated bonus points to be redeemed for free phone time.

SUMMARY OF THE INVENTION

Generally, to overcome the above-described problems, the present invention provides a method and apparatus for awarding and redeeming telephone time to a member of an incentive award program, such as a slot club. According to one feature of the invention, a slot card issued by a slot club, or a membership card in another incentive award program, may be used as a prepaid phone calling card. In one embodiment, free phone time may be provided to a slot machine player as an immediate and low-cost reward for the continued playing of a slot machine. When a player plays at a slot machine or other electronic gaming device and inserts his slot card, the player can be credited with free phone time in small increments valued below the minimum win payout. The free phone time is credited to the player's slot card account in the casino's database The free phone time may optionally be displayed on a video monitor associated with the slot machine thus allowing the player to see and track his rewards as he receives them.

The slot card, or a membership card in another incentive award program, may be later used as a prepaid phone card to place phone call. The player simply dials the phone number, for example, an "800" toll-free number, on the back of the card. That call is received by a caller interface, such as an interactive voice response unit, which queries the player for his slot card identifier and the desired telephone number to be called. Once that information is entered by the player, a controller matches the identifier to the player's account in the casino's database containing the player's free phone time. If the identifier matches a valid account and sufficient time has been credited to the account, the controller then causes a telephone switch to place the call to the entered telephone number. The call will continue until the account balance has been depleted or the call is disconnected by either party. The controller then debits the player's account automatically for the time of the call. The next time the player uses his slot card, the remaining free phone time is optionally displayed on the video monitor.

The present invention provides the players a small reward for playing the machine, from 1 second up to a few minutes of phone time. Since each second of phone time can be purchased at a relatively low cost, for example 0.2 cents, free phone time is an affordable reward for the casino. Moreover, free phone time, and the accumulation thereof, is a flexible reward, and is easily understood and redeemed, thus providing players a strong incentive to play the slot machines longer, or even to choose a casino which offers this reward over another that does not

BRIEF DESCRIPTION OF THE DRAWINGS

These and other features and advantages of the present invention can best be understood by reference to the detailed description of the preferred embodiments set forth below taken with the drawings, in which:

FIG. 2 depicts a member database for maintaining information associated with each member of the reward program, for use in the first embodiment of the present invention.

FIG. 3 depicts a calls record database for maintaining information on each telephone call processed by the system of FIG. 1, for use in the first embodiment of the present invention.

DETAILED DESCRIPTION OF THE PREFERRED EMBODIMENTS

This system is for awarding free telephone time for using a service, such as a slot machine, and for redeeming that time. The term "slot machine" as used herein refers to any programmable gaming terminal controlling a random or random event in which one or more players can bet on the outcome of the event, including traditional slot machines, video bingo, video keno, video poker and video blackjack devices. Of course, the system is not limited to use with slot machines, but may also be used with table games, such as blackjack, craps, poker, sports book, keno and bingo When used with table games, the free telephone time is typically awarded by a casino employee who monitors the player's activity and allocates the time to the player's account. Further, the service may be non-casino related, such as a travel service, where instead of free miles, the traveler is provided with free phone time. It should be noted that table games implement a player tracking system which is very similar to that used by slot machines. When a player initiates play at a gaming table, he presents his player tracking card to casino personnel who then insert that card into a player tracking reader. As is the case with the system used with slot machines, the information on the card is then transmitted to a network server. Based on the length of play and increments of wagers, points are awarded to the player as play continues.

According to a feature of the invention, discussed further below, telephone time may be awarded to a player in accordance with casino-specific rewards criteria which determines the amount: of telephone time to be awarded (i) as an incentive reward for playing the slot machine, (ii) as a payout in lieu of a traditional payout (for example, certain slot machines may award five seconds of telephone time for two oranges on the first two reels), or (iii) as a supplement to the traditional payout (for example, certain slot machines may award three dollars ($3) and five seconds of telephone time for two cherries).

Figure 1:
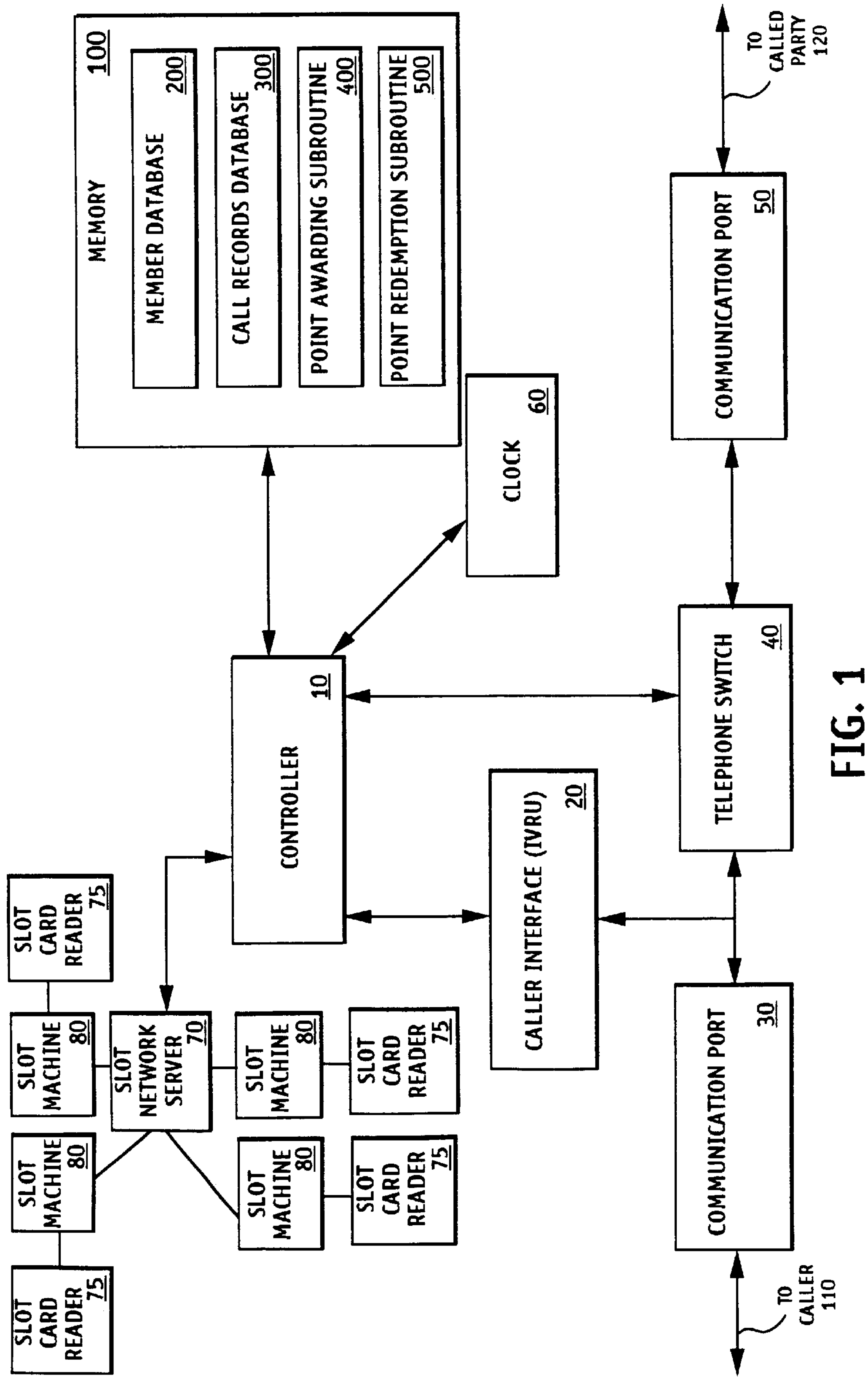
FIG. 1 is a block diagram illustrating a prepaid phone card reward program system according to a first embodiment of the present invention.

FIG. 1 is a block diagram illustrating a prepaid phone card reward program system according to a first embodiment of the present invention. The casinos, or the known gambling venues, house the slot machines 80, each slot machine having connected thereto or integrated therewith a slot card reader 75.

The slot machines 80 are preferably networked to a slot network server 70, as shown in FIG. 1. It is noted that if a slot network server 70 is not utilized, the functionality provided by the network server 70 for awarding player reward points, as discussed below, could be provided directly in the slot machines 80, as would be apparent to a person of ordinary skill. The slot machines 80 and slot network server 70 transmit digitally encoded data and other information between one another. The transmitted data and other information may represent player name and identifier, play results and authenticated player identification. The communications link between the slot network server 70 and the slot machines 80 preferably comprises a cable or wireless link on which electronic signals can propagate.

The slot network server 70 is connected to a system controller 10. The system controller 10 may be embodied as a single processor, or a number of processors operating in parallel. Memory 100 is operable to store one or more instructions, as discussed below in conjunction with FIGS. 4 and 5, which the system controller 10 is operable to retrieve, interpret and execute. The system controller 10 preferably includes a control unit, an arithmetic logic unit (ALU), and a CPU local memory storage device, such as, for example, a stackable cache or a plurality of registers, in a known manner. The control unit is operable to retrieve instructions from the memory 100. The ALU is operable to perform a plurality of operations needed to carry out instructions. The CPU local memory storage device is operable to provide high speed storage used for storing temporary results and control information.

The controller 10 is connected to a system clock 60, and to memory 100. As discussed below in conjunction with FIGS. 2 and 3, respectively, the memory 100 includes a member database 200, which stores information on each player enrolled in the slot club program, and a call records database 300, which stores information on each telephone call processed by the system. Memory 100 also contains computer readable programs comprising a point awarding subroutine 400 and point redemption subroutine 500, discussed below in conjunction with FIGS. 4 and 5, respectively. Memory 100 may physically comprise a RAM or other computer storage device, such as a hard disk drive or a floppy disk drive, for storing the databases and the programs. The programs may also be separately stored in ROM. The controller 10 is also connected to a caller interface 20, such as an interactive voice response unit (IVRU), which in turn is connected to both a first communication port 30 for receiving a call on line 110, preferably toll-free, from the player, and a telephone switch 40. The telephone switch 40 is also connected to a communication port 50 for placing a call from the player to a called party on line 120. The operation of the system will be described in more detail below.

When a player joins a slot club program, the casino typically issues a player a slot card, encoded with a players' membership identifier, for example, by means of a magnetic strip or keypunch encoding. In addition, the casino opens a corresponding data record account for the player in its member database 200. When playing, the player selects a slot machine 80, and preferably inserts the slot card into the associated slot card reader 75. The slot card reader 75 reads the player's membership identifier off the magnetic strip or keypunch of the slot card and transmits the identifier to the slot network server 70. The slot network server 70 authenticates the player's membership account and causes the computerized system controller 10 to access the member database 200 in memory 100. The controller 10 matches the player's identifier to the player's data record account in the member database 200. The data record is used by the system to track and reward the player's slot playing, in a manner described further below.

Thus, every time the player inserts a slot card and plays the slot machine 80, the controller 10 credits free telephone time in accordance with the predefined casino-specific rewards criteria, from 1 second to a few minutes or more, in the data record associated with the player's member identifier, as discussed below in conjunction with FIG. 4. By awarding seconds of time, rewards in fractional amounts of the minimum payout are possible. For example, 5 seconds of long distance telephone time to anywhere in the continental United States may cost the casino only a penny.

Thus, if the minimum payout is 25 cents, 5 seconds of telephone time is only one-twenty-fifth of the minimum payout. The amount of telephone time credited to the player's current account balance, in accordance with predefined casino-specific rewards criteria, may be based on any one of the following, or combination thereof: (1) an amount of currency played by the player of the slot machine, (2) an amount of currency the player has won from the slot machine, (3) an amount of time the player has played the slot machine, or (4) an amount of currency with which the player started playing the slot machine If telephone time is awarded every time the player pulls the handle, the slot machine may be advantageously promoted as providing a "win for every spin."

Similarly, the present invention allows the casino to pay out an entire win in telephone time instead of coins or as a supplement to the traditional coin payout, and further permits payouts in non-integral multiples of the minimum win payout consisting of telephone time alone, or both telephone time and coins. For example, a thirty cent win payout may be distributed as a quarter and 25 seconds of telephone time. In this case, the 25 seconds of telephone time is not a reward, but part of the payout—the player may still receive additional telephone time as a reward for simply playing or winning.

An example of member database 200 is shown in FIG. 2, wherein a data record comprises the member's identifier, optional biographical information (such as name, address, home telephone number, room number and credit card numbers), historical usage information, and current account balance. Historical usage information may optionally be used by the casino in determining the value of the award offered to the player. Preferably, the current account balance is also displayed to the player on a video monitor associated with the slot machine, thus allowing the player to see and track his free telephone time as it is rewarded. As stated above, a telephone time reward can also be awarded directly into the player's account by a casino employee.

In order to redeem the telephone time, the player removes the slot card from the slot card reader and uses the card as a prepaid calling card, as discussed below in conjunction with FIG. 5. The player makes this phone call preferably using an "800" number printed on the back of the slot card. This call is received by the IVRU 20, via the communication port 30. Upon receipt of the call, the IVRU 20 prompts the player for his member identifier and the telephone number for the party to be called, and once entered by the player, sends this information to the controller 10. The controller 10 preferably confirms that the indicated member identifier is valid and thereafter accesses the member database 200 to retrieve the current account balance. The controller 10 transmits the retrieved account balance to the IVRU 20. The IVRU 20 may then inform the player of the available telephone time.

If the current account balance is sufficient, the controller 10 then configures the telephone switch 40 to establish a telephone connection to a called party over line 120 via the second communication port SO. The switch connects the caller line 110 to the called party line 120. The call continues until discontinued by either the caller or called party, or until the account balance has been depleted. The controller 10 causes the data record in the call records database 300 associated with the player's member identifier to be debited by an amount equal to the duration of the call.

Alternatively, the current account balance may be maintained in units of money, for example, fractions of a cent, as opposed to seconds or minutes. For example, when the player is awarded player reward points, the controller 10 credits the player's account with 0.2 cents. In this example, when the player uses the slot card as a prepaid calling card, the cost of the telephone call, rather than its duration, is debited from the player's account. The controller 10 can calculate the cost of the call by known ways in the telephone service art. For example, a geographically variable per minute rate can be implemented by including a rate database which provides the per minute rate for the area code of the dialed number. The player's account is then debited by an amount equal to the rate corresponding to the dialed number times the duration of the call. In addition, if the player's credit card number is input into the member database 200, the player may be given an option to continue the call beyond the total rewarded telephone time, by allowing the system to charge his credit card account.

FIG. 3 depicts a calls record database for maintaining information on each telephone call processed by the system of FIG. 1. Each call record includes the caller identifier, date and time of the call, called number, call duration and the phone service carrier's member identifier As will be understood by one of ordinary skill in the art, the redemption functionality, discussed below in conjunction with FIGS. 5A and 5B, can be provided by the proprietor of the slot incentive reward program or by an independent third-party prepaid phone service vendor. If telephone time redemption is provided by the former, that is, by the casino itself, then the slot network server 70 and the controller 10 of FIG. 1 could use the same computer processor and share the same memory. In an embodiment where the telephone time redemption is performed by an independent third-party phone service vendor, the updates to the member database 200 by the casino to award newly earned player reward points are batched by the casino for transmission to the third-party phone service vendor or provided via a continuous online connection.

Figure 4:
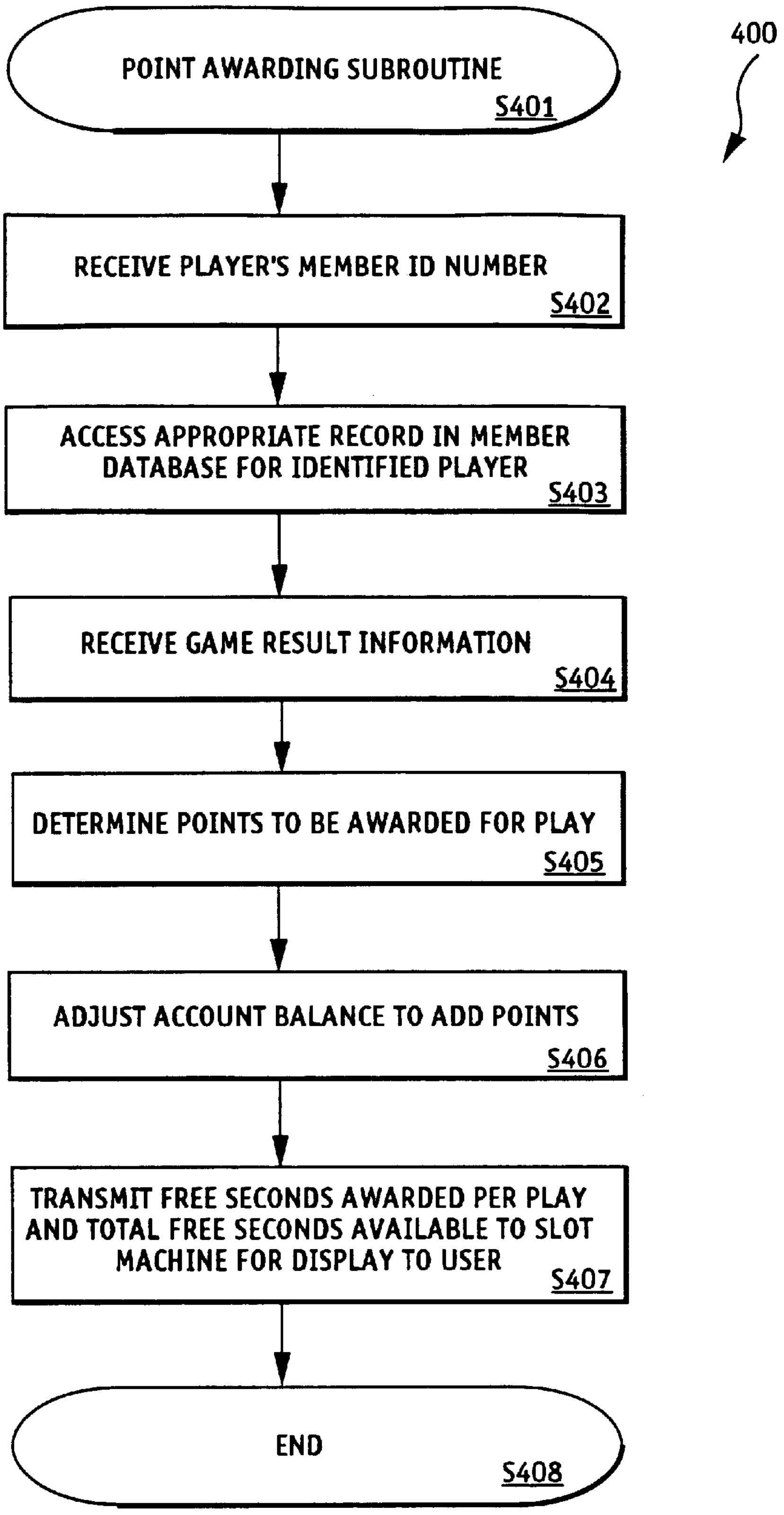
FIG. 4 is a flow chart describing an example of a point awarding subroutine for use by the system of FIG. 1 in the first embodiment of the present invention.

FIG. 4 is a flow chart describing an example of a point awarding subroutine 400 stored in memory 100 and accessed and executed by the controller 10 of FIG. 1. As described above, the points can correspond to, for example, either free telephone time in seconds or money in fractions of a cent. In step S401, the point awarding subroutine begins. In step S402, the controller 10 receives the player's membership identifier. In step S403, the controller 10 accesses the record in the member database 200 associated with the identifier. After receiving the game result information in step S404, the controller 10 determines how many points are to be awarded for the game play in step S405. In step S406, the controller 10 then adds the awarded points to the player's account balance in the member database 200. In step S407, the controller 10 then optionally sends the number of points, for example, seconds, rewarded for the game play and the total number of points in the player's account to the display driver for the display. The subroutine ends in step S408.

Figure 5A:
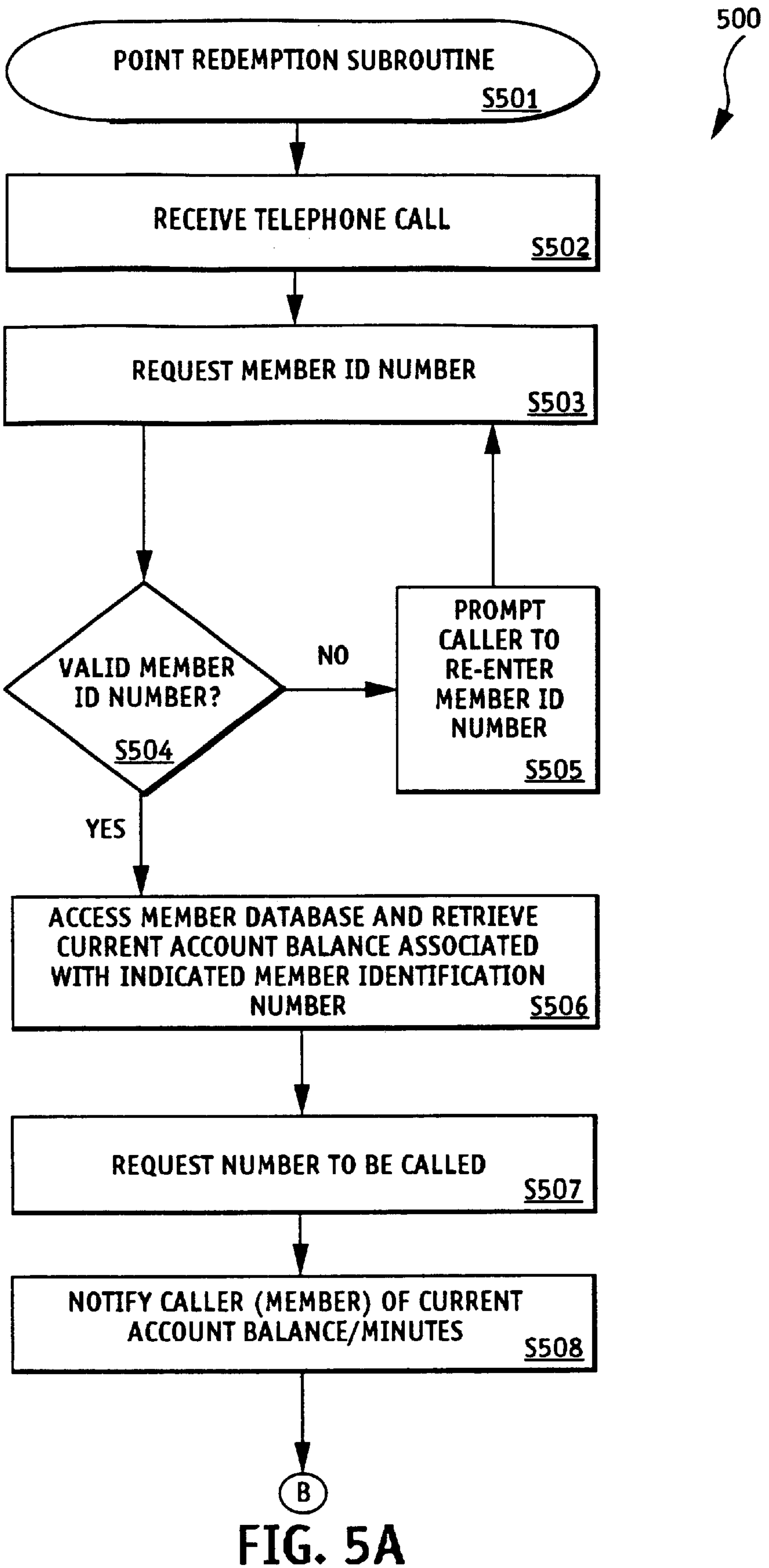
FIGS. 5A and 5B are flow charts describing an example of a point redemption subroutine for use by the system of FIG. 1 according to the first embodiment of the present invention.
Figure 5B:
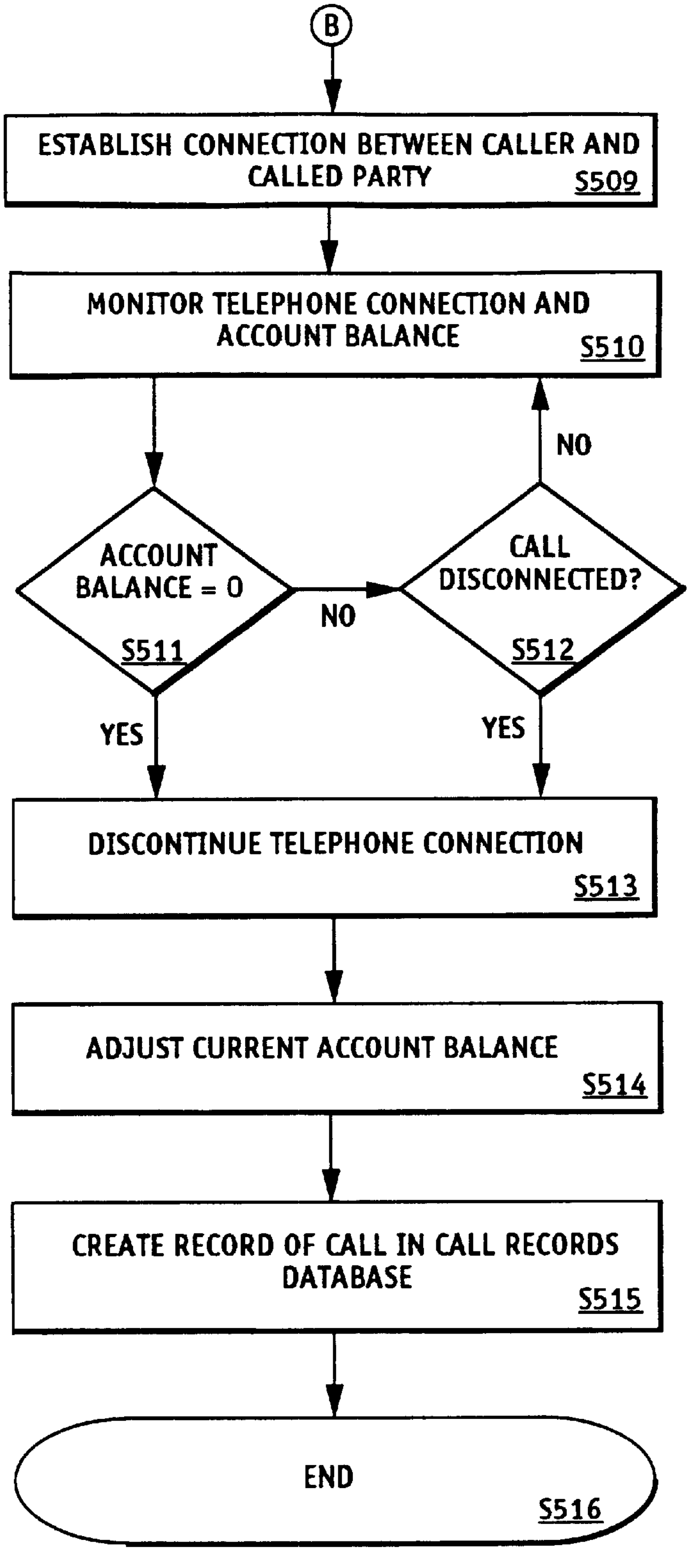

FIGS. 5A and 5B are flow charts describing an example of a point redemption subroutine 500 stored in memory 100 for use by the controller 10. The point redemption subroutine begins in step S501, and in step S502, the controller 10, via communication port 30 and IVRU 20, as described above, receives a telephone call from the player. In step S503, the controller 10 causes the IVRU 20 to prompt the player for the player's member identifier. In step S504, the controller 10 checks the member database 200 to make sure the identifier is valid. If not, in step S505, the controller 10 causes the IVRU to re-request the identifier. If valid, the controller accesses the member database 200 and retrieves the current account balance associated with the membership identifier in step S506. In step S507, the controller causes the IVRU 20 to prompt the player for the telephone number of the party to be called, and in step S508, causes the IVRU 20 to notify the player (caller) of the current account balance, for example, in minutes or money.

In step S509 (FIG. 5*b*), the controller 10 then causes, via the telephone switch 40, the connection between the caller and the called party to be made, and in step S510, the controller 10 monitors the telephone connection and the account balance, which is continuously debited to reflect the current duration (or cost) of the call. If the account balance reaches zero in step S511, or if either party disconnects the call in step S512, the connection is discontinued in step S513. Otherwise, if the account balance is not zero and the call has not been discontinued, the subroutine returns to step S510 to continue monitoring the call. After the telephone connection is discontinued in step S513, the controller 10 in step S514 adjusts the current account balance, if necessary, and in step S515, creates a record of the call in the call records database 300. The subroutine ends in step S516.

It will be appreciated that a player may utilize his free telephone time without actually having the player card in his possession. He need only have available to him his account number or identifier number, and the telephone number required to call into the telephone service provider.

In an alternative embodiment, instead of a slot machine network, the controller 10 is connected to a computerized travel service network or any service network where points are awarded to members as an incentive for using the service. In this embodiment, the travel service network passes the traveler's membership card identifier to the controller, which in turn allocates free phone time to a data record associated with the traveler's membership identification in its member database 200. The amount of phone time is now based on usage of the traveling service and other parameters, such as the number of miles traveled, mode of transportation, and the like. The traveler can then use his travel card as a prepaid phone card in the same way as the slot card as described above.

Of course, it will be appreciated that the invention may take forms other than those specifically described, and the scope of the invention is to be determined solely by the following claims.

What is claimed is:

1. A computer readable medium in which is stored computer readable code to be executed by a computer, the computer readable code performing a method comprising the steps of:

receiving an identifier that identifies a user of a slot machine and an amount of usage of the slot machine;

awarding telephone time based on the amount of usage of the slot machine; and storing and accumulating the awarded telephone time in a data record associated with the received user identifier.

* * * * *